United States Patent Office 3,481,386
Patented Dec. 2, 1969

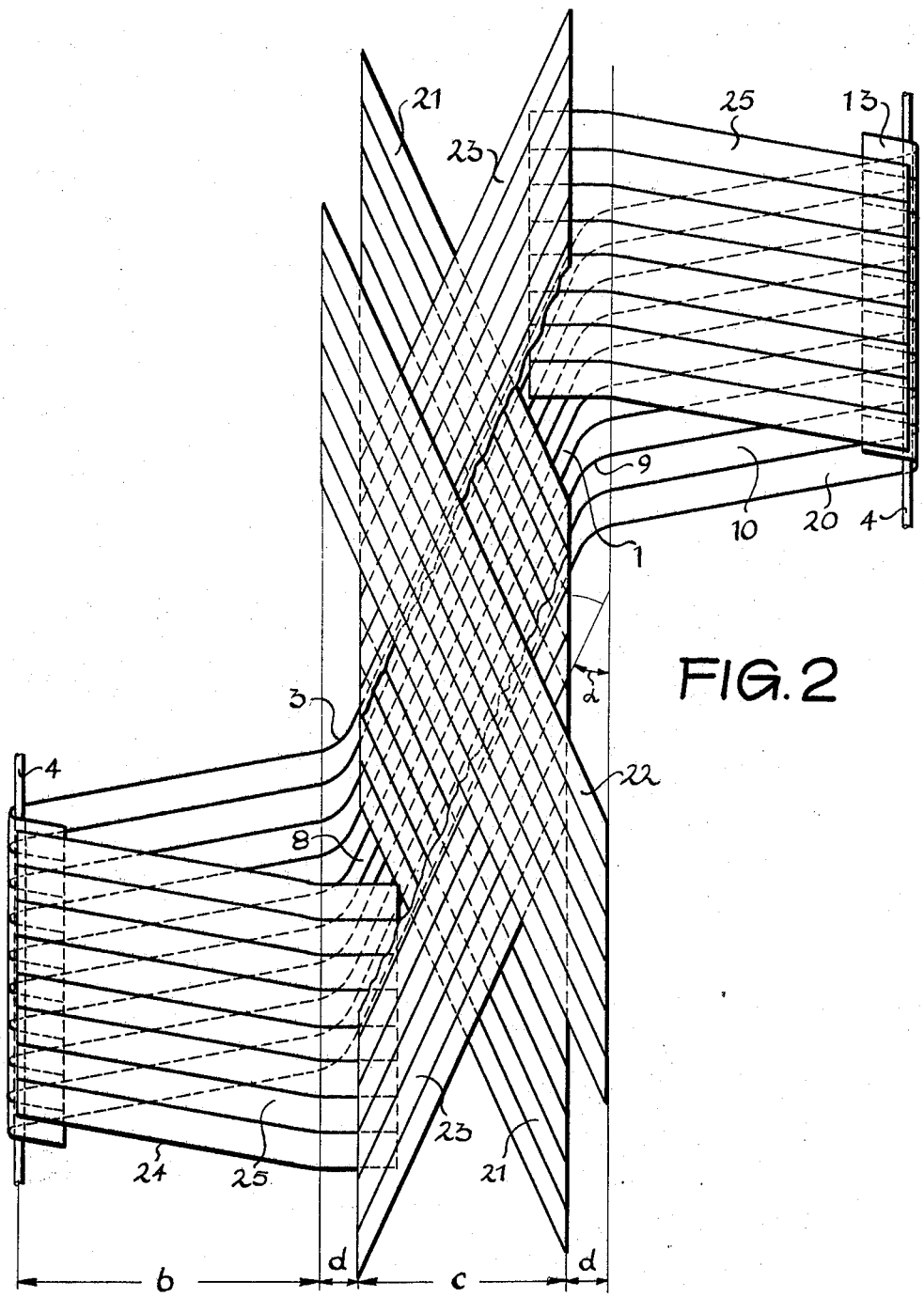

3,481,386
PNEUMATIC VEHICLE TIRE
Hans Menell, Ahlem, Hannover, and Walter Scheithauer,
Meyenfeld, Germany, assignors to Continental Gummi-
Werke AG, Hannover, Germany
Filed June 14, 1967, Ser. No. 646,082
Claims priority, application Germany, June 15, 1966,
C 39,359
Int. Cl. B60c 11/00
U.S. Cl. 152—354                                5 Claims

ABSTRACT OF THE DISCLOSURE

The present invention relates to a pneumatic vehicle tire having a carcass with threads or wires extending from bead to bead and in the tread strip zone defining an acute angle with the circumferential direction of the tire while in the tire side walls defining an approximately right angle with the circumferential direction of the tire. The threads or wires of the carcass all extend in one and the same inclined direction. The tire has furthermore one or more cord fabric layers arranged in the tread strip zone, the threads or wires of which extend in oppositely inclined directions with regard to the circumferential direction of the tire while crossing the threads or wires of the carcass. The tire of the invention is characterized primarily in that in the tire side walls there are arranged additional parallel threads or wires which extend from the bead cores into the respective adjacent tire shoulder and cross the respective adjacent thread portions of the carcass.

---

Figure 1:
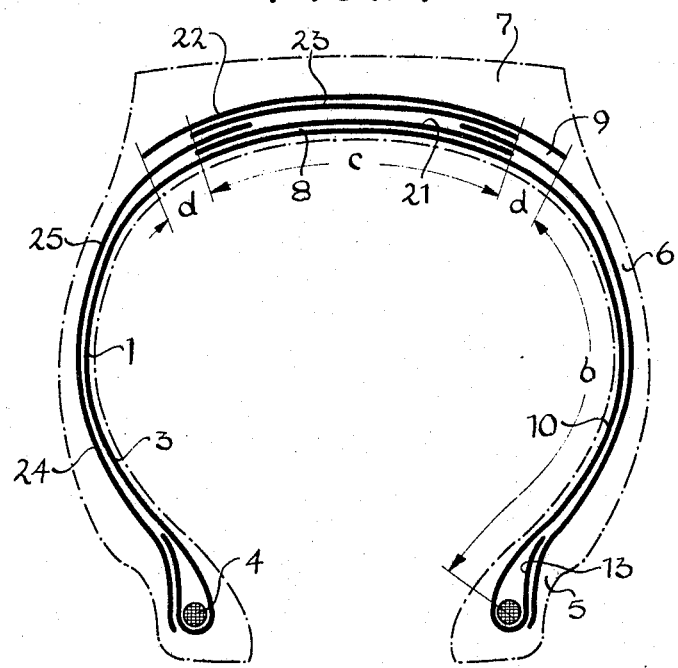

The present invention relates to a pneumatic vehicle tire with a belt-like reinforcing insert in the tread strip zone which reinforcing insert is placed under tension by the tire inner pressure. More specifically, the present invention relates to such pneumatic vehicle tire in which at least a portion of the threads or wires extending at an incline with regard to the circumferential direction of the tire and located below the tread strip merges with the threads or wires which pass through the tire side walls and are anchored in the tire beads. The thread sections extending at an incline with regard to the circumferential direction of the tire and located below the tread strip extend primarily solely over the width of the tread strip while the remaining thread sections or a portion thereof extend at an oppositely directed incline with regard to the circumferential direction of the tire and are located below the tread strip while forming a carcass reinforcement which extends uninterruptedly from bead to bead.

Tires of this type have proved useful. However, when such tires are subjected to particularly strong stresses and increased tire inner pressures, it has been found that special steps are necessary for reinforcing the tread strip marginal portions, especially in order to avoid wear of the marginal areas of the tread strip during shimmying of the front wheels. Furthermore, steps are necessary to avoid distortions of the tire side walls.

It is, therefore, an object of the present invention to provide a pneumatic vehicle tire of the above mentioned type in which even under increased or special stresses the tread strip marginal areas of the tire will not wear prematurely.

It is another object of this invention to provide a pneumatic vehicle tire as set forth in the preceding paragraph in which distortions of the tire side walls will not occur as a result of the inner pressure placing the tire tread strip zone under pressure.

These and other objects and advantages of the invention will appear more clearly from the following specification in connection with the accompanying drawings in which:

FIG. 1 is a partial section through a pneumatic vehicle tire according to the invention.

FIG. 2 diagrammatically represents the reinforcing inserts of the tire which for a clearer explanation have been shown as being located in one and the same plane.

According to the present invention, additional pull-resistant threads or wires are arranged in cord position in the tire side walls. These additional threads or wires extend from the beads to the tire shoulders and, more specifically, in such a way that the said threads or wires toward the zenith portion of the tire and within the range of the tire shoulders overlap the bent or angled off portions of the threads which extend uninterruptedly from bead to bead. The said additional threads or wires are so arranged that they cross the threads or wires in the tire side walls, said threads or wires extending from bead to bead. The crossing angle may vary from 5 to 25°. It is particularly advantageous in this connection to arrange the sections of the threads or wires which extend uninterruptedly from bead to bead and the additionally provided threads or wires so that they cross each other symmetrically with regard to the transverse direction of the tire. The above mentioned threads or wires thus extend in oppositely inclined directions so that a cross connection is formed in the tire side walls which cross connection brings about a so-called blocking of the reinforcing inserts in the tire side walls. In this way, also with higher tire inner pressures, a distortion of the tread strip zone relative to the tire beads while the tire side walls distort, will be prevented. Since, however, the crossing angles are rather small, the thus formed cross connection will practically not influence the flexibility of the tire side walls. Since furthermore the additional threads or wires extend into the tire shoulders, they bring about a stiffening and calming down of the marginal tread strip zones so that also shimmying movements, when using tires on guided wheels, will not result in a premature wear.

Referring now to the drawings in detail, the tire body consisting of rubber or similar material has a carcass built up of a layer 1. The pull-resistant threads 3 of said layer 1 are parallel to each other. The threads 3 extend from bead to bead, and the free ends are anchored by being looped around the bead cores 4 in the tire feet 5.

As will be evident from the drawings, the tire wall is subdivided into wall sections b, c and d. The sections b determine the tire side walls 6, and the section c represents primarily the zenith portion of the tire the width of which is practically determined by the tread strip 7.

In the sections b, c and d the threads 3 are arranged in a different way. Within the area c, the thread sections 8 extend at an incline to the tire circumferential direction and, more specifically, at an angle α which amounts from 5 to 25°, preferably however approximately 15°. The thread sections 8 merge through the curvatures 9 in areas d with the thread sections 10 which extend through the wall sections b, i.e. the side walls 6. The thread sections 10 are with regard to the transverse direction 20 of the tire located at an angle of from 5 to 10° while maintaining the inclination determined by the thread sections 8. The ends 13 of the thread sections 10 are looped around the bead cores 4.

In the tread strip zone there are provided cord fabric layers 21, 22 and 23 of which the layers 21 and 23 extend over the wall section c whereas the cord fabric layer 22 extends additionally at both sides over the wall sections d.

In this way a belt-like reinforcing ring is formed which is composed of four cord fabric layers while the threads or wires of layer 21 form pairs with the thread sections 8 whereas the threads or wires of the layer 23 form pairs with the threads or wires of layer 22. Also the threads or wires of layers 21, 22 and 23 are corresponding to the thread sections 8 arranged so as to extend at an angle of from 5 to 25° with regard to the tire circumferential direction, preferably, however, at an angle of 15°. More specifically, as shown in FIG. 2, the thread sections 8 cross the threads or wires of layer 21, and the threads or wires of layer 22 cross those of layer 23 symmetrically with regard to the tire circumferential direction. In this connection it is important that the pull-resistant threads 3 which extend uninterruptedly from bead to bead are exclusively arranged and extend solely in one inclined direction.

Additional parallel threads or wires 24 are embedded in the sections $b$ and $d$. These additional wires form in both tire side walls one layer 25 each. The pull-resistant threads 24 are likewise arranged at an incline with regard to the transverse direction 20 but cross the thread sections 10. Preferably, also in the wall section $b$ a symmetric cross connection is obtained with regard to the transverse direction 20. To this end, the threads 24 are arranged at the same angle of inclination as the thread sections 10.

Those ends of the threads 24 which are adjacent the bead cores 4 are, as shown in FIG. 1, placed against the bead core 4 while ending freely. However, if desired, the ends of said threads 24 may be looped around the bead core 4. Those ends of the threads 24 which face the tread strip 7 are so placed that they will cover the wall section $b$ with the curves 9. The free ends also extend through the marginal zones of the wall section $c$. This brings about not only a very satisfactory anchoring of the upper ends of threads 24 but also results in a calming down and a stiffening of the marginal tread strip areas. Moreover, due to the overlapping of the wall sections $d$, a fixing or blocking of the curvatures 9 of the threads 3 is obtained so that also the here located thread sections 9 will not undergo a stretching or enlarging of their curvature as a result of the tire inner pressure.

The threads 3 which, according to the embodiment shown, are arranged in one layer are not under all circumstances necessary. If, however, two or more layers 25 are employed, it is important that all uninterruptedly extending threads 3 are practically parallel to each other which would mean that they describe the longitudinally extending S shown in FIG. 2. A crossing of the threads 3 among each other is not intended. Cross connections are obtained only by the layers 21, 24 and 25 and, more specifically, in connection with the threads 3 and the layer 23.

It is, of course, to be understood that the present invention is, by no means, limited to the particular structure shown in the drawings but also comprises any modifications within the scope of the appended claims. It is also to be understood that the term "thread means" as it appears in the following claims comprises not only threads, but also wires, cables, ropes, etc.

What we claim is:

1. A pneumatic vehicle tire with a tread strip, with tire shoulders, and with beads, which comprises a carcass having first thread means extending from bead to bead through the tire side walls and the tread strip zone in an uninterrupted manner and in the tread strip zone defining an acute angle with the circumferential direction of the tire while in the tire side walls defining an approximately right angle with the circumferential direction of the tire, those portions of said carcass thread means which are located in said tread strip zone all extending in one and the same angular direction with regard to the circumferential direction of the tire, cord fabric layer means located in said tread zone and having second thread means crossing the circumferential direction of the tire at opposite angles and symmetrically thereof while simultaneously some of said second thread means also cross those portions of said first thread means which are located in said tread strip zone, and third thread means located in said side walls and extending substantially parallel to each other from said beads into said tire shoulders while crossing the respective adjacent portions of said first thread means.

2. A vehicle tire according to claim 1, in which said third thread means form with the circumferential direction of the tire an angle within the range of from 5° to 15°.

3. A vehicle tire according to claim 1, in which said third thread means and the respective adjacent portions of said first thread means which extend uninterruptedly from bead to bead are substantially symmetrically arranged with regard to the transverse direction of the tire.

4. A vehicle tire according to claim 1, in which said third thread means extend into the zenith portion of the tire to such an extent as to overlap that area over which said first thread means pass from the tread strip zone into the tire side walls.

5. A vehicle tire according to claim 1, which includes additional cord fabric layer means located in said tread strip zone and having additional cord fabric thread means thereof cross each other while forming an acute angle with the circumferential direction of the tire, at least one of said additional layer means having the marginal portions thereof overlap that area over which said first thread means pass from the tread strip zone into the tire side walls.

References Cited

UNITED STATES PATENTS

| 3,058,509 | 10/1962 | Maiocchi | 152—356 |
| 3,275,056 | 2/1965 | Menell | 152—356 |
| 3,327,753 | 6/1967 | Travers | 152—356 |

FOREIGN PATENTS 1,446,822  6/1966  France.

ARTHUR L. LA POINT, Primary Examiner

CHARLES B. LYON, Assistant Eaminer

U.S. Cl. X.R.

152—361